United States Patent
de Castro

(10) Patent No.: US 9,781,177 B2
(45) Date of Patent: Oct. 3, 2017

(54) DYNAMIC CONFERENCED COMMUNICATIONS

(71) Applicant: Cisco Technology, Inc., San Jose, CA (US)

(72) Inventor: Jose de Castro, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 14/675,633

(22) Filed: Mar. 31, 2015

(65) Prior Publication Data

US 2016/0014169 A1 Jan. 14, 2016

Related U.S. Application Data

(60) Provisional application No. 61/973,184, filed on Mar. 31, 2014.

(51) Int. Cl.
*H04L 29/06* (2006.01)
*H04M 7/00* (2006.01)
*H04M 3/56* (2006.01)

(52) U.S. Cl.
CPC .......... *H04L 65/403* (2013.01); *H04M 3/563* (2013.01); *H04M 7/0012* (2013.01)

(58) Field of Classification Search
CPC .... H04L 65/403; H04M 7/0012; H04M 3/563
See application file for complete search history.

(56) References Cited

U.S. PATENT DOCUMENTS

| | | | | |
|---|---|---|---|---|
| 2004/0199580 A1* | 10/2004 | Zhakov | ............... | H04L 12/1818 709/204 |
| 2008/0084831 A1* | 4/2008 | Sylvain | ............... | H04L 12/1822 370/260 |
| 2011/0271332 A1* | 11/2011 | Jones | .................... | H04L 9/3247 726/7 |
| 2013/0287197 A1* | 10/2013 | Yap | ........................ | H04M 3/56 379/202.01 |

* cited by examiner

*Primary Examiner* — Wei Zhao

(57) ABSTRACT

A system for dynamic conferenced communications, comprising a communication application server that handles interactions between conference participants, a communications bridge that receives interactions from participants via the Internet or other data networks, and a telephony switch that receives and handles interactions from participants via a telephone network, and a method for providing dynamic communications conferencing.

20 Claims, 7 Drawing Sheets

DYNAMIC CONFERENCED COMMUNICATIONS

CROSS-REFERENCE TO RELATED APPLICATIONS

This application claims priority to U.S. provisional patent application Ser. No. 61/973,184, titled "DYNAMIC CONFERENCED COMMUNICATIONS," which was filed on Mar. 31, 2014, the specification of which is hereby incorporated by reference in its entirety.

BACKGROUND OF THE INVENTION

Field of the Art

The disclosure relates to the field of telecommunications, and more particularly to the field of conferenced communications between more than two participants.

Discussion of the State of the Art

In the field of telecommunications, the act of creating or hosting a telephone call with more than two participants (known as a "conference call") is common. Generally, such a call requires specialized actions on the part of either the host or participants, or both. For example, it is common in the art to require a host to connect to and configure a conference calling service that in turn hosts the call on their behalf. It is also common to require participants to enter specific information such as their name or an access code, to be allowed to participate in the conference call.

Such an approach is inconvenient and potentially error-prone, requiring the dissemination of information or procedures specific to each conference call before its members may participate, and potentially requiring the use of expensive or inconvenient third0party services or products to facilitate the conference function entirely.

Furthermore, with regard to Intern-based communication such as voice over internet protocol (VOIP) communications, conference calling often requires the purchase of a specific product or service to enable conference calling, or to enable specific features that may be desirable (such as video communications), otherwise restricting and limiting the utility provided by a conference call.

What is needed, is a means to provide easy and convenient conferencing of communications regardless of the medium or technologies utilized for communication, that does not require specific actions or information to participate.

SUMMARY OF THE INVENTION

Accordingly, the inventor has conceived and reduced to practice, in a preferred embodiment of the invention, a system and method for dynamic conferenced communications.

According to preferred embodiment of the invention, a method for dynamically handling conferenced communications is disclosed. According to the embodiment, a conference host or initiator may enable conferencing by any appropriate means (such as by configuring settings via a software application, or using special dialing codes or text messages, as described below with reference to FIGS. 5 and 6), after which new members or participants may join the conference by a variety of convenient means such as by simply dialing a known contact number for the host (i.e., their personal or office telephone line). When a participant connects to the host, they may optionally be verified with any configured conference settings (such as, for example, verifying whether a particular individual was given an invitation to the conference or was placed on a whitelist of approved participants), and may then be connected directly to the conference without needing to perform any special actions (such as giving their name or entering a special code to connect, as are common in traditional arrangements). In this manner, participants may easily and conveniently join a conference without needing to remember special information or perform special actions, simply by contacting the host via a previously-known, familiar communications means.

According to another preferred embodiment of the invention, a system for dynamic conferenced communications comprising a conferencing server, a web server, an application server, and a CTI server, is disclosed. According to the embodiment, each server component may be a hardware or software component such as a dedicated computing device or a software service or application operating on a network-connected computing device, and it should be appreciated that a single network-connected device may operate multiple components (either multiple components of a single arrangement, such as a single computer operating both a web and application server, or components of multiple arrangements such as a single computer operating web servers for more than one system simultaneously).

According to the embodiment, a conferencing server may receive and handle conference requests via a network (such as, for example, a telephone network or the Internet, or any other suitable communications network), such as when an individual sets up a conference (via any of a variety of means, described below) or attempts to join a conference. A CTI server may receive and handle interactions via a telephone network, such as when an individual calls a phone number associated with a conference or inputs a dialing code via a telephone to configure conferencing. A web server may receive and handle interactions via the Internet or other data communications network, and may interact with an application server to provide interactive means over a network, In this manner, it can be appreciated that conferencing becomes possible regardless of the nature of a particular communications network, whether it may be via telephone call or internet communication, or any other suitable communication means.

According to the embodiment, a database may also be utilized such as to store and provide information related to conferencing, such as previously-configured settings or preferences, or logging of conference information, or any other such information that may be considered relevant or useful to a particular conference or to the function of a system in general. A database may be any suitable data storage means, such as hardware-based storage media (such as integral or removable storage media, for example optical storage discs or magnetic storage drives), or any of a variety of suitable software-based storage means (such as any of a variety of database schema common in the art), or any other suitable means for storing information for later use by components of a system.

It should be appreciated that while this application and several examples and arrangements described herein make reference to conferencing of telecommunications (i.e., a "conference call"), the invention is suitable for a wide variety of communication means including but not limited to audio (such as a telephone call), video (such as FACETIME™ or other video communications services or technologies), or text-based communications (such as via short message service (SMS) or other text-based chat technologies), and it should be further appreciated that a particular arrangement according to the invention may utilize multiple communications means interchangeably or simultaneously.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
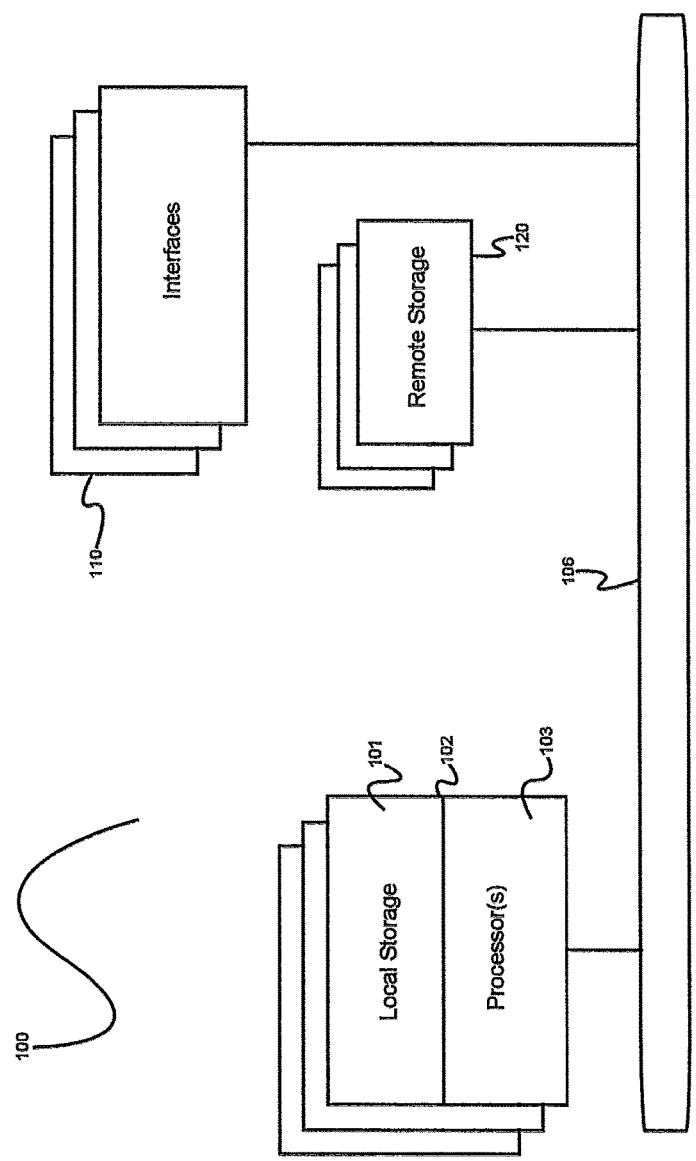
FIG. 1 is a block diagram illustrating an exemplary hardware architecture of a computing device used in an embodiment of the invention.

The inventor has conceived, and reduced to practice, a system and method for dynamic conferenced communications.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
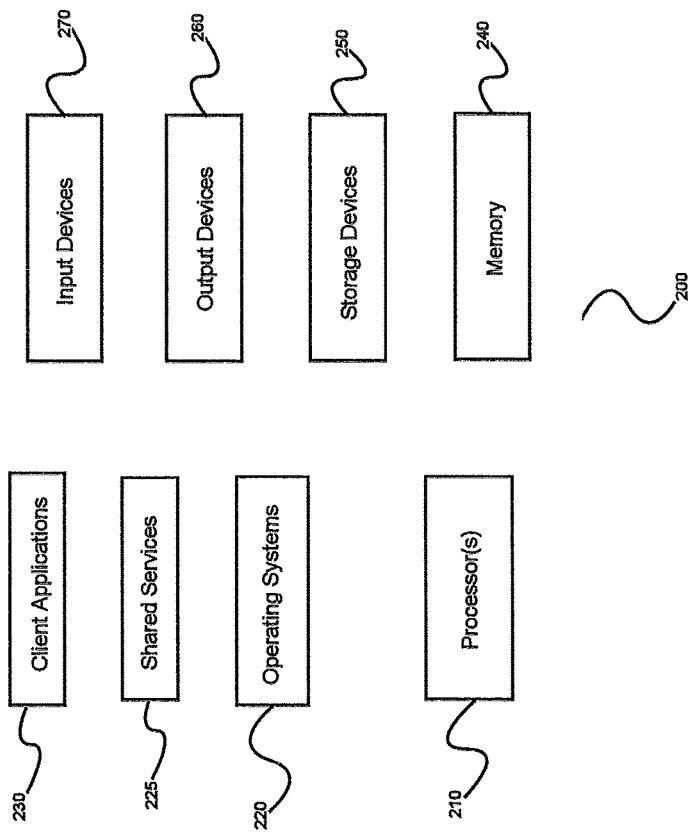
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
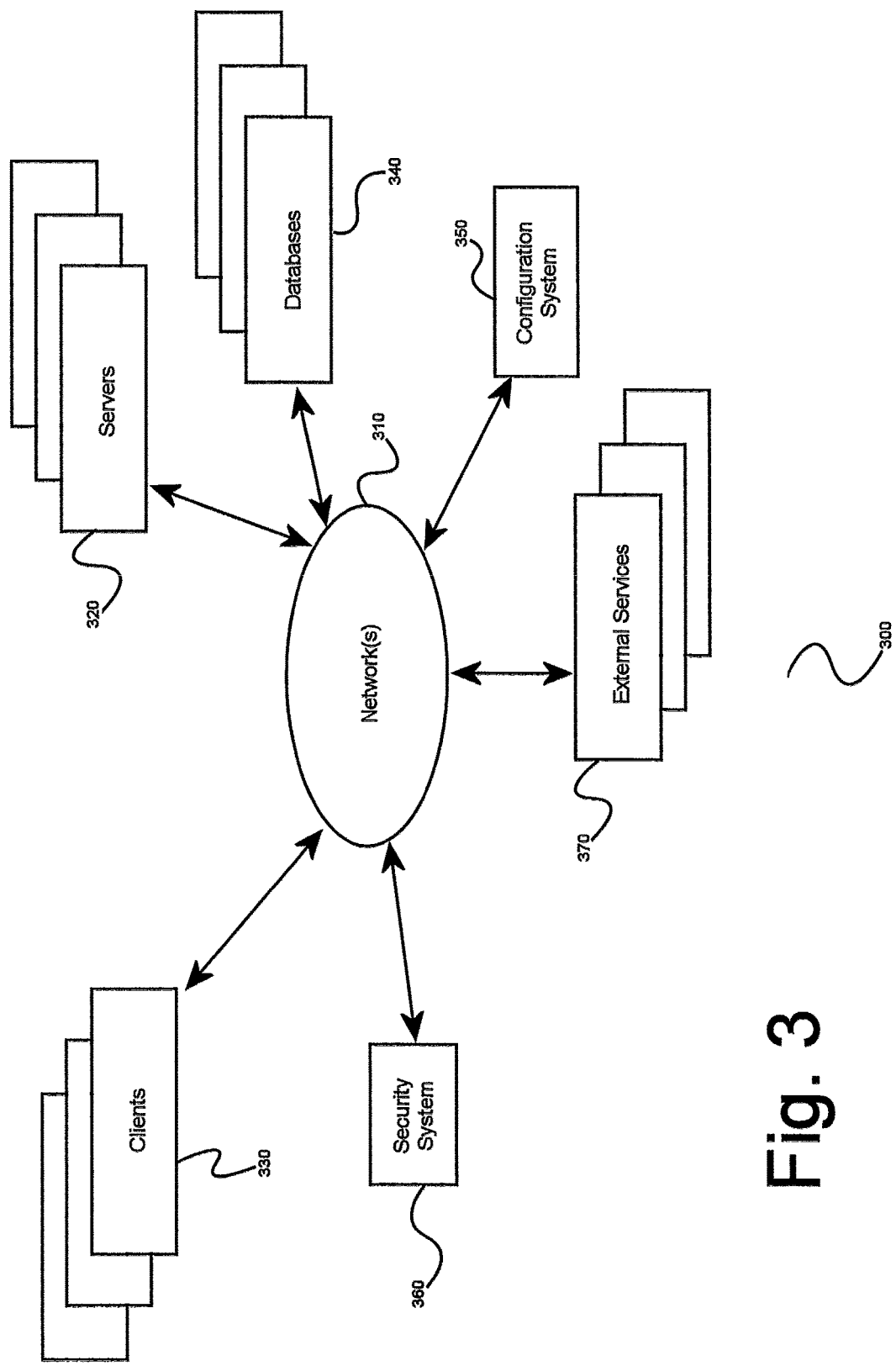
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
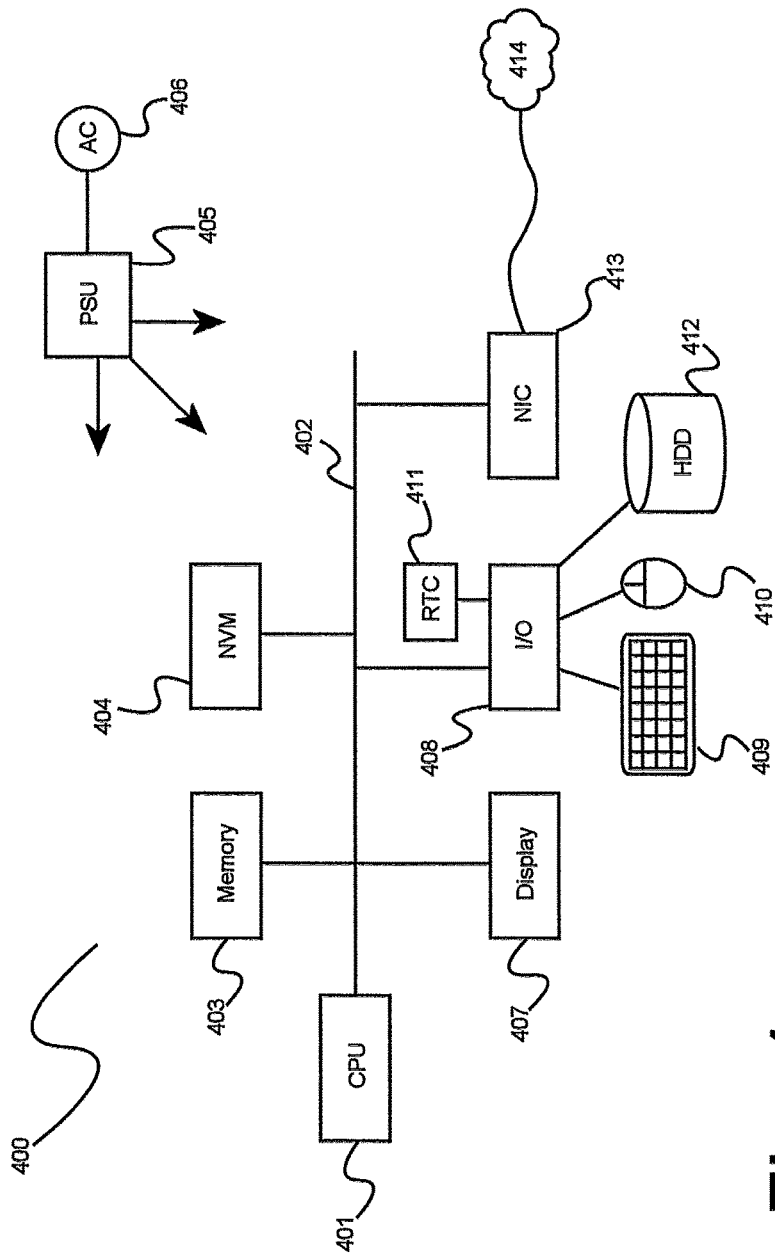
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
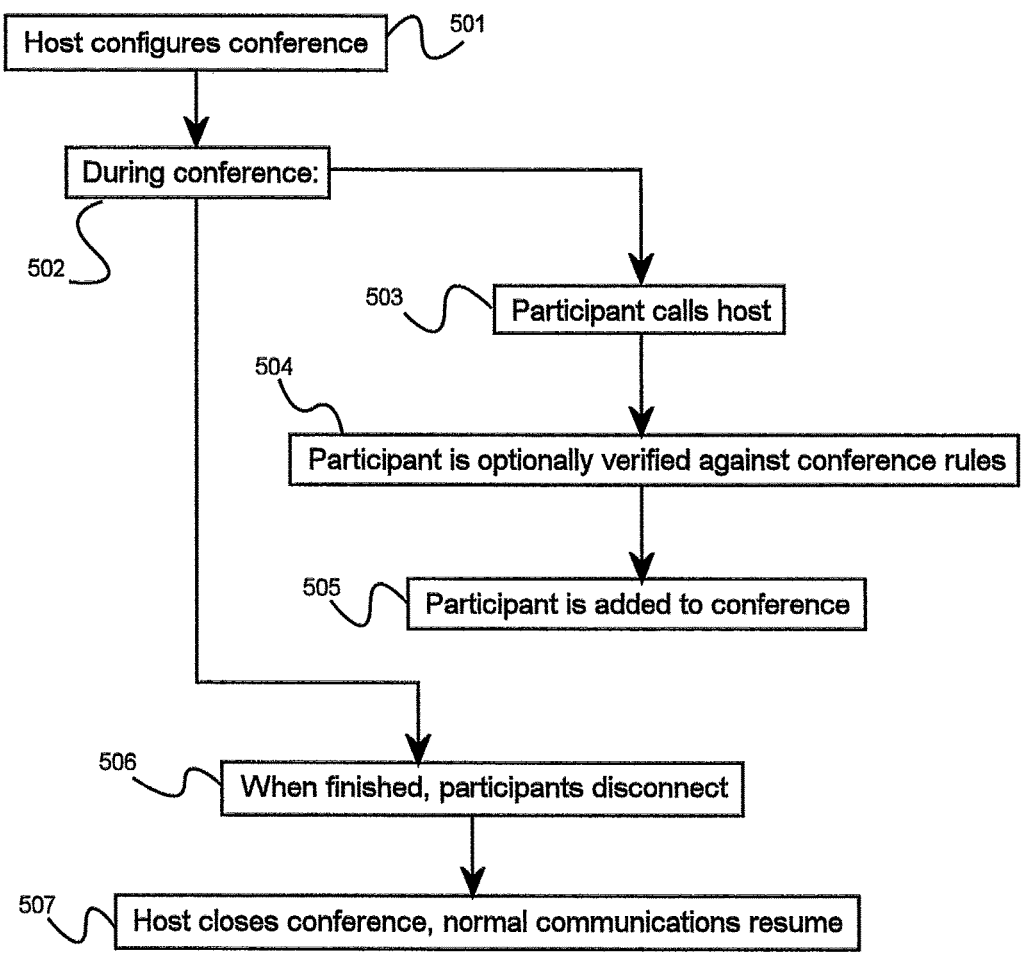
FIG. 5 is a method flow diagram of an exemplary method for dynamic conferenced communications, according to another preferred embodiment of the invention.

FIG. 5 is a method flow diagram, illustrating an exemplary method 500 for providing dynamic conferencing according to a preferred embodiment of the invention. As illustrated, in an initial step 501 an individual may setup a conference, such as when they wish to host a conference for other participants. This setup may be performed via any of a number of suitable means according to a particular arrangement, such as by computer interaction over the Internet or other data communications network (such as when the host is using a computer to interact with a configuration website or software application, or via interaction with a mobile application operating on a mobile computing device such as a tablet or laptop computer), or may be through telephone interaction such as using special dialing codes (as are commonly used in the art to perform special functions on a telephone, such as checking account information or retrieving voicemail messages), or via any other suitable communication means.

In a next step 502, a conference may be initiated and made available to other participants to join. According to the invention, this initiation may be configured (either automatically as a default option, or manually configured by a host in a previous step 501) to route all incoming calls to a host's telephone number to the conference, such that anyone calling them would be added to the conference call (eliminating the need for special phone numbers, codes, or interaction with a call conferencing system as are commonly utilized in the art). During a conference, participants may attempt to join in a next substep 503, such as by calling a host's telephone number or otherwise interacting with a host's communication means. In a next substep 504, participants may optionally be verified such as by comparing against a host's conference settings, for example to verify whether a participant is on a "whitelist" or otherwise marked as being allowed to join a conference (for example when a host wishes to have only specific participants, rather than allow anyone to join and participate), or whether a particular participant has met any prerequisites for participation (such as ensuring they have a compatible communications device, for example requiring all participants to be on a mobile phone with a camera for a video conference). Pending successful verification (if performed), a participant may be added to a conference and begin participation in a next substep 505.

In a next step 506, participants may disconnect from a conference (such as simply by hanging up the phone, or by manually disconnecting via other means), and when all participants have left a conference may be considered concluded (however, it is possible that other participants may join, therefore a lack of participants may not automatically close a conference). In a final step 507, a host may choose to manually close a conference, thus preventing any new members from joining, and normal communications resume (for example, calling their phone number now results in a "normal", one-on-one phone call rather than adding a caller to a conference for others to join).

In this manner, it can be appreciated that creating and joining conferences becomes very simple and convenient, as ordinary and familiar communication means are utilized and no specific factors may be required for participation. However, additional functionality remains via conference configuration, allowing more specific requirements or preferences to be set, so a host retains the option to configure a conference exactly how they prefer, and both convenience and functionality may be available to them and other participants as appropriate according to their particular needs. Additionally, it can be appreciated that adding new participants to a conference becomes simplified as well, as no special process is required and the only information needed to join may be a single phone number (such as when a conference is configured to route all calls to a host into the conference, as described previously in step 501), so a new participant may be given an "invitation" to an existing or future conference by simply giving them the host's contact information. This may be seen to ease participation for users, for example they may not be required to input any personal information to join such as a name or an access code, and they may come and go easily by simply connecting and disconnecting just as they might when communicating with an individual normally (i.e., when not conferencing).

It should be appreciated that while the context of a conferenced telephone call is described herein by way of example, the methods and arrangement described are equally suitable for any of a variety of communication means, such as voice over internet protocol (VOIP) calls (as might function very similarly to the telephone calls described above, utilizing an internet connection instead of a telephone network), video conferencing via such telephone or internet-connected video communication technologies as FACETIME™ or similar, or any other suitable means of communicating over a network.

Detailed Description of Exemplary Embodiments

Figure 6:
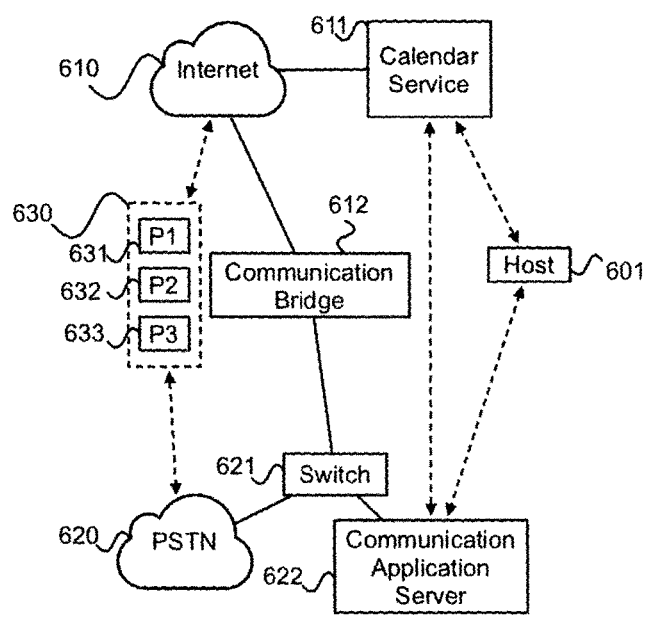
FIG. 6 is a block diagram of an exemplary system architecture for dynamic conferenced communications, according to a preferred embodiment of the invention.

FIG. 6 is block diagram of an exemplary system architecture 600 for dynamic communications conferencing, according to a preferred embodiment of the invention.

As illustrated, a system 600 may comprise a host 601, a data communications network such as the Internet 610 or other data network, a public switched telephone network (PSTN) 620 or another telephonic communications network (such as a cellular network), and a plurality of participants 630. According to the embodiment, host 601 and participants 631, 632, and 633 may be any appropriate network-connected device for communication, for example a personal computer, smartphone, or other mobile communications device and may connect to a communications network such as the Internet 610 or a PSTN 620 according to a particular device being utilized.

As illustrated, a telephony switch 621 may be utilized and may be connected to a telephony network 620 such as to receive and route calls and other communications, as is commonly utilized in the art. A communications application server (CAS) 622 may be utilized as illustrated, and may be connected to a switch 621 to receive relevant communications according to the invention, such as (for example) calls that may participate in a conference. Additionally, a CAS 622 may perform conferencing functions such as operating a particular conference and connecting participants, or operating the configuration or other aspects of a conference or of particular hosts or participants (such as, for example, if a particular host wishes to store a user profile or other information to ease configuration in the future, such as by retrieving and utilizing stored or preconfigured settings to speed up the creation or management of a conference).

According to the embodiment, a host 601 may connect to a CAS 622, for example either directly such as via a software application for interaction (such as a mobile software app operating on a mobile device such as a smartphone) or indirectly such as via communication over an appropriate communication network 620 such as by calling a particular telephone number or utilizing a special dialing code (as are common in the art for performing special functions via a telephone handset). A host 601 may interact with a CAS 622 for such purposes as to configure or establish a conference, as may be appropriate when setting up a conference for immediate use, or configuring preferences or settings for future use, such as setting up default preferences for future conferences or setting up a particular conference in advance, such as for a scheduled time. Additionally, a host 601 may interact with a calendar server 611 (such as via a calendar app operating on a smartphone or other mobile communications device, or via an interactive website or other network-connected software via an appropriate network 610), such as to configure a scheduled conference or to send calendar invitations (as are commonly utilized in the art) such as to notify other individuals of a conference so they may participate.

As further illustrated, a communication bridge 612 may be utilized, such as to allow communication between networks (such as, for example, between a PSTN 610 and the Internet 620), such as to allow participants to communicate regardless of their particular devices or other considerations. For example, according to the embodiment, a host 601 may establish a conference with a CAS 622 via a telephone connection (such as by using special dialing codes to enable conferencing on their phone number, for example), and then participants 630 may connect via the Internet 610, as their interactions may be facilitated by a connection bridge 612 to allow communication with the CAS 622 according to the invention.

Figure 7:
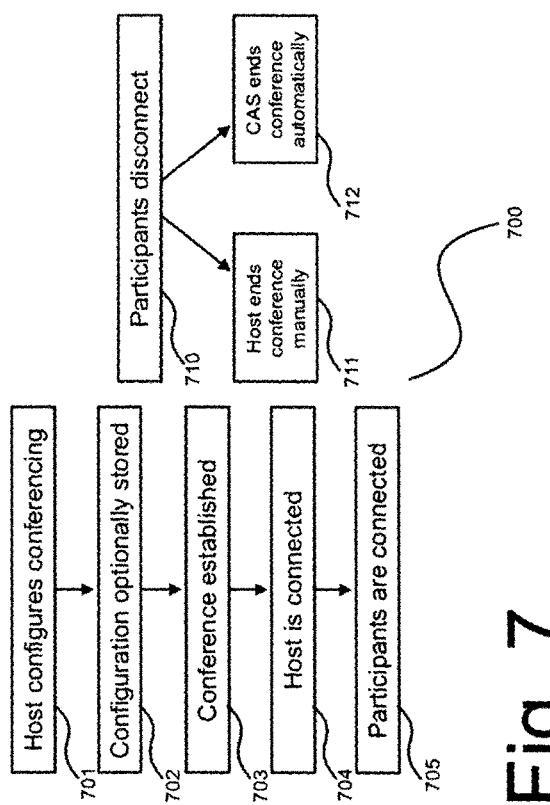
FIG. 7 is a method flow diagram of an exemplary method for conference call creation and teardown.

FIG. 7 is a method flow diagram of an exemplary method 700 for conference call creation and teardown, illustrating the general process by which a host may setup a conference (such as through interaction with a CAS as described previously, referring to FIG. 6), and subsequent closure or disconnection of a conference either by a host or by automated processes (such as might be performed by a CAS). In an initial creation step 701, a host may connect to a CAS to configure a conference. Such a connection may vary in technical nature, for example a host may connect via a PSTN such as by entering special dialing codes on a telephone handset or by calling a special telephone number (such as might be utilized to put the host's device in "conference mode"), or by interaction via a network-connected software application such as a mobile app operating on a smartphone or other mobile communication device, or a website or other interactive Internet-connected software for conference configuration. In a next step 702, this configuration may optionally be stored such as in a database or physical storage medium (for example, integral or removable storage media such as magnetic or optical storage drives), such as to use in future conference configuration (such as a host establishing preferred "default" settings for future conferences to expedite their creation). In a next step 703, a CAS may establish a conference based on configuration (such as either a predefined or stored configuration as described previously, or manually-configured settings as performed in an initial step 701), at which point a conference may be considered "live". It should be appreciated that there may be an arbitrary time delay as appropriate between steps, for example a host may configure a conference to be established at a determined future time or optionally as triggered by an event (such as setting up a conference to be initiated when a particular individual calls them, or when a particular notification is sent to a CAS by an external program or service, such as might be utilized to facilitate integration with third-party products or services). In a next step 704, a CAS may (if appropriate) contact a host to establish their presence in a conference, such as when a future-dated conference is initiated (for example, a CAS may call a host to begin the conference, rather than requiring them to stay connected during an interim time period). In a final step 705, participants may join a conference such as by dialing in to a host's telephone number or via another appropriate contact means, or interchangeably a CAS may contact participants (such as in a manner similar to contacting a host in a previous step 704), to bring them into a conference when appropriate. For example, a host may configure a conference with a set of chosen participants to be included, and a CAS may contact them at the appropriate time (i.e., when a conference begins) to notify them and give them the opportunity to join the conference. Optionally, additional participants may be permitted to join a conference in progress according to a particular configuration.

In a first teardown step 710, participants may leave a conference such as by hanging up their phones or otherwise disconnecting from the interaction. In a next step 711, a final participant may disconnect, such that only a host remains in a conference. At this point, according to a particular configuration (such as may have been established in a setup step 701), a host may manually end a conference in a manual end step 712 (such as by interaction with a software element or by using a special dialing code to stop conferencing on their telephone line, or any other appropriate manual interaction means according to a particular configuration), or a CAS may automatically close a conference when the appropriate conditions (such as might have been manually configured during setup in a step 701, or retrieved from stored or default configuration as described previously), for example when the last participant has left or after a configured time period (such as for a conference with a defined start and end time). Additionally, a CAS may (as appropriate) notify participants that the end of a conference is approaching, such as via an audible tone or message, or via a text or video-based notification, according to a participant's particular device or connection or a particular conference configuration.

The skilled person will be aware of a range of possible modifications of the various embodiments described above. Accordingly, the present invention is defined by the claims and their equivalents.

What is claimed is:

1. A method comprising:
   at a communications application server:
   receiving, from a host user, a configuration of an electronic conference, the configuration including a host user electronic conference setting;
   initiating the electronic conference based on the configuration;
   receiving, via a telephony network, a routed call from a potential participant, wherein the routed call is to a host user telephone number corresponding to a personal or work host user telephone number that is configured for one-on-one telephone calls when the electronic conference is not configured;
   verifying the potential participant according to the host user electronic conference setting; and
   if the verification is successful, automatically connecting the potential participant to the electronic conference.

2. The method of claim 1, wherein if the verification is unsuccessful, preventing the potential participant from connecting to the electronic conference.

3. The method of claim 1, wherein the host user electronic conference setting marks a specific potential participant as being allowed to join the electronic conference.

4. The method of claim 3, wherein the host user electronic conference setting is a whitelist of the specific potential participant.

5. The method of claim 3, wherein the host user electronic conference setting is an invitation for the specific potential participant to participate in the electronic conference.

6. The method of claim 1, wherein the host user electronic conference setting includes prerequisites for participants to join the electronic conference.

7. The method of claim 6, wherein the prerequisites include requiring all participants to be on a mobile phone with a camera for a video conference.

8. The method of claim 1, further comprising closing the electronic conference such that subsequent incoming calls to the host user telephone number result in the one-on-one telephone calls.

9. An apparatus comprising:
   a memory; and
   one or more processors configured to, on behalf of a communications application server:
   receive, from a host user, a configuration of an electronic conference, the configuration including a host user electronic conference setting;
   initiate the electronic conference based on the configuration;
   receive, via a telephony network, a routed call from a potential participant, wherein the routed call is to a host user telephone number corresponding to a personal or work host user telephone number that is configured for one-on-one telephone calls when the electronic conference is not configured;
   verify the potential participant according to the host user electronic conference setting; and
   if the verification is successful, automatically connect the potential participant to the electronic conference.

10. The apparatus of claim 9, wherein the one or more processors are further configured to, if the verification is unsuccessful, prevent the potential participant from connecting to the electronic conference.

11. The apparatus of claim 9, wherein the host user electronic conference setting marks a specific potential participant as being allowed to join the electronic conference.

12. The apparatus of claim 11, wherein the host user electronic conference setting is a whitelist of the specific potential participant.

13. The apparatus of claim 11, wherein the host user electronic conference setting is an invitation for the specific potential participant to participate in the electronic conference.

14. The apparatus of claim 9, wherein the host user electronic conference setting includes prerequisites for participants to join the electronic conference.

15. The apparatus of claim 14, wherein the prerequisites include requiring all participants to be on a mobile phone with a camera for a video conference.

16. The apparatus of claim 9, wherein the one or more processors are further configured to close the electronic conference such that subsequent incoming calls to the host user telephone number result in the one-on-one telephone calls.

17. One or more non-transitory computer readable storage media encoded with instructions that, when executed by a processor of a communications application server, cause the processor to:
   receive, from a host user, a configuration of an electronic conference, the configuration including a host user electronic conference setting;
   initiate the electronic conference based on the configuration;
   receive, via a telephony network, a routed call from a potential participant, wherein the routed call is to a host user telephone number corresponding to a personal or work host user telephone number that is configured for one-on-one telephone calls when the electronic conference is not configured;
   verify the potential participant according to the host user electronic conference setting; and
   if the verification is successful, automatically connect the potential participant to the electronic conference.

18. The non-transitory computer readable storage media of claim 17, wherein the instructions further cause the processor to, if the verification is unsuccessful, prevent the potential participant from connecting to the electronic conference.

19. The non-transitory computer readable storage media of claim 17, wherein the host user electronic conference setting marks a specific potential participant as being allowed to join the electronic conference.

20. The non-transitory computer readable storage media of claim 17, wherein the host user electronic conference setting includes prerequisites for participants to join the electronic conference.

* * * * *